United States Patent
Patel et al.

(10) Patent No.: US 8,767,743 B2
(45) Date of Patent: Jul. 1, 2014

(54) TECHNIQUES FOR EFFICIENT DATA TRANSFERS IN A BODY AREA NETWORK

(75) Inventors: Maulin D. Patel, Tuckahoe, NY (US); Richard Chen, Croton-On-Hudson, NY (US)

(73) Assignee: Koninklijke Philips N.V., Eindhoven (NL)

(*) Notice: Subject to any disclaimer, the term of this patent is extended or adjusted under 35 U.S.C. 154(b) by 425 days.

(21) Appl. No.: 13/058,004

(22) PCT Filed: Aug. 7, 2009

(86) PCT No.: PCT/IB2009/053499
§ 371 (c)(1),
(2), (4) Date: Apr. 6, 2011

(87) PCT Pub. No.: WO2010/018523
PCT Pub. Date: Feb. 18, 2010

(65) Prior Publication Data
US 2011/0176520 A1 Jul. 21, 2011

Related U.S. Application Data

(60) Provisional application No. 61/087,747, filed on Aug. 11, 2008, provisional application No. 61/087,749, filed on Aug. 11, 2008.

(51) Int. Cl.
*H04L 12/28* (2006.01)

(52) U.S. Cl.
USPC .......................... 370/395.4; 370/458

(58) Field of Classification Search
USPC .............................. 370/395.4, 458
See application file for complete search history.

(56) References Cited

U.S. PATENT DOCUMENTS

| 8,301,760 B1* | 10/2012 | Zadicario et al. | 709/224 |
|---|---|---|---|
| 2003/0012166 A1* | 1/2003 | Benveniste | 370/338 |
| 2008/0019343 A1* | 1/2008 | Benveniste | 370/338 |
| 2008/0144560 A1* | 6/2008 | Jia et al. | 370/312 |
| 2010/0111099 A1* | 5/2010 | Yonge et al. | 370/458 |

* cited by examiner

*Primary Examiner* — Sai-Ming Chan
(74) *Attorney, Agent, or Firm* — Larry Liberchuk

(57) ABSTRACT

A method for transferring data among devices in a body area network (BAN). The method comprises dividing an access time to a wireless medium of the BAN into at least a contention-based period (510) and a contention-free reservation period (520); allowing devices to transfer data during the contention-based period using a local prioritized contention access (LPCA) mechanism; and allowing only devices having reserved time slots to transfer data during the contention-free reservation period (520).

14 Claims, 9 Drawing Sheets

TECHNIQUES FOR EFFICIENT DATA TRANSFERS IN A BODY AREA NETWORK

This application claims the benefit of U.S. Provisional Application No. 61/087,747 and U.S. Provisional Application No. 61/087,749, both filed on Aug. 11, 2008.

The invention generally relates to medium access control (MAC) protocols utilized in low power wireless sensor networks, such as body area networks (BANs).

A body area network (BAN) is primarily designed for permanent monitoring and logging of vital signs. An exemplary BAN 100, shown in FIG. 1, includes multiple nodes 120 which are typically sensors that can be either wearable or implantable into the human body. The nodes 120 monitor vital body parameters and movements, and communicate with each other over a wireless medium. The nodes 120 can transmit data from a body to one or more devices 130 from where the data can be forwarded, in real-time, to a hospital, clinic or elsewhere over a local area network (LAN), a wide area network (WAN), a cellular network, and the like.

The requirements for designing BANs include energy efficiency of nodes 120, scalability, integration, interference mitigation, coexistence, high quality of service (QoS), and security. Efficient energy consumption can be achieved by optimally duty cycling a receiver device (i.e., a device receiving data) between a listen state and a sleep state. In the sleep state a radio transceiver of the device is turned off, thereby saving energy. A duty cycling is performed by a MAC protocol with the aim of minimizing idle listening, overhearing, collisions and controlling overhead.

The IEEE 802 standards committee has developed a family of standards for wireless local and personal area networks, such as the IEEE 802.11 designed for wireless local area networks, and the IEEE 802.15.4 designed for wireless personal area networks (WPANs). None of these protocols is a suitable candidate for wireless BANs. For instance, the IEEE 802.15.4 standard defines a MAC protocol for short range transmissions which suffers from several limitations preventing this protocol from being utilized in BANs.

Specifically, the IEEE 802.15.4 standard beaconing mode supports star and tree network topologies. The network coordinator establishes the network and becomes the root of the tree. The nodes in the tree have parent-child relationships. Typically, the data is transferred between a parent and a child. The leaf nodes in the tree typically do not send beacons. Such a transfer mode is not suitable for BAN applications due to the risk of a single point of failure.

The active period of beaconing devices is fixed a priori and is the same for all the beaconing devices belonging to a network. This could result in either over provisioning and wasted energy or under provisioning and limited QoS. Since the duty cycle requirement of BAN devices varies from device to device and from time to time, the fixed duty cycling approach of IEEE 802.15.4 is not suitable for the BAN.

In addition, in the IEEE 802.15.4 beacon-enabled mode, the network coordinator can optionally allocate a limited number (e.g., 7) of guaranteed time slots which are typically not sufficient to provide the desired level of QoS for BAN applications.

For at least the shortcomings described above, it would be therefore advantageous to provide a solution for reserving time slots for data transfer and for transferring data between devices to support the different requirements of BAN applications.

Certain embodiments of the invention include a method for transferring data among devices in a body area network (BAN). The method comprises dividing an access time to a wireless medium of the BAN into at least a contention-based period and a contention-base reservation period; allowing devices to transfer data during the contention-based period using a local prioritized contention access (LPCA) mechanism; and allowing only devices having reserved time slots to transfer data during the contention-free reservation period.

Certain embodiments of the invention further include scheduling time slots reservation requests for master devices in a body area network (BAN). The method comprises receiving, during a current time round, from each master device a reservation request including at least a number of time slots to be allocated in a superframe in a next time round, wherein the reservation request is through a global beacon; and sequentially scheduling the requests for reservation by contiguously allocating time slots in each superframe.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
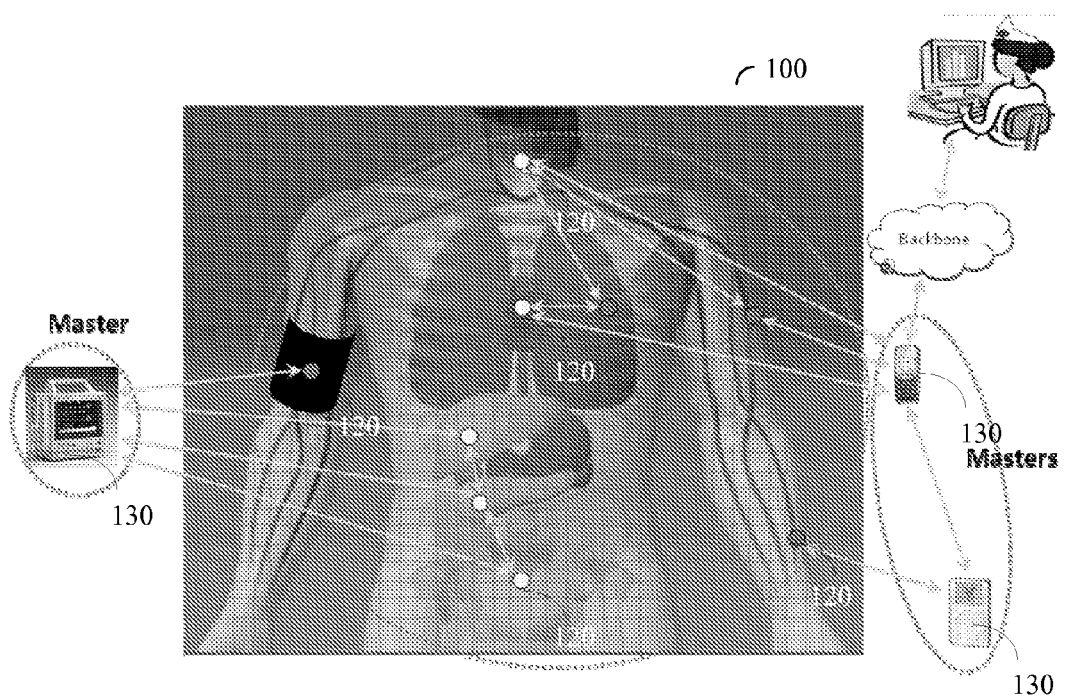
FIG. 1 is a schematic diagram of a body area network.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
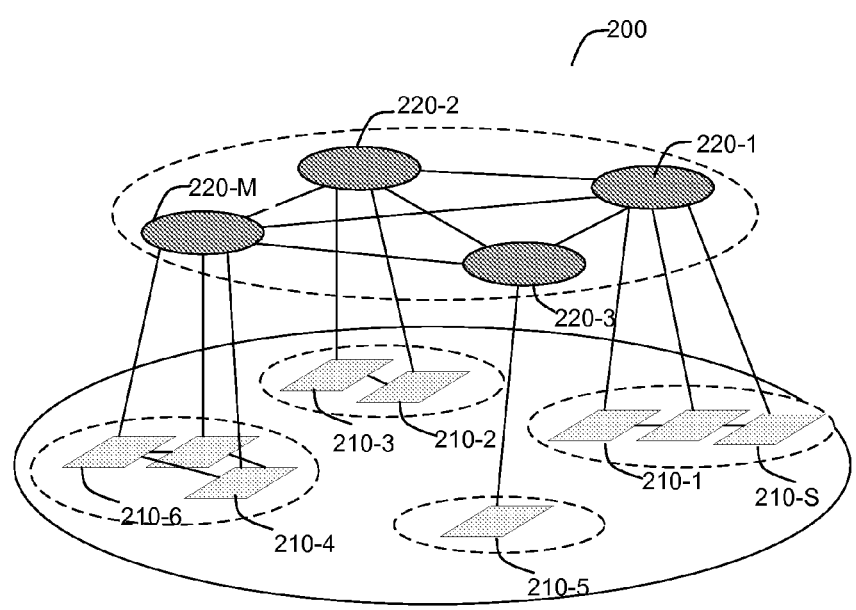
FIG. 2 illustrates a topology of a body area network utilized to describe the various embodiments of the invention.

FIG. 2 shows a topology of a body area network (BAN) 200 utilized to describe the various embodiments of the invention. The BAN 200 includes two tiers of devices: slave devices 210-1 through 210-S and master devices 220-1 through 220-M. Typically, the slave devices 210-1 to 210-S are implantable, swallowable or disposable and characterized by having low energy budgets and limited resources (e.g., processing power, memory). On the other hand, the master devices 220-1 to 220-M are wearable, can be recharged frequently and therefore have higher energy budgets and more resources than the slave devices.

A master device 220-Z (where Z is an integer equal to or greater than 1) manages one or more slave devices 210-G (where G is an integer equal to or greater than 1). To this end, a master device 220-Z transmits periodic beacons for synchronization, requesting medium reservation, and announcing broadcast/multicast. Based on the information exchanged by the periodic beacons, the master device 220-Z derives a conflict-free reservation schedule to enable QoS support. In addition, the master device 220-Z detects the presence of another BAN located within its transmission range to support the harmonized coexistence of multiple co-located BANs, each of which can potentially execute a different application.

In the topology illustrated in FIG. 2, all master devices 220-1 to 220-M synchronize the medium access and implement reservation using a distributed global beaconing process. In a preferred embodiment of the invention the access to the medium is divided into fixed and repeated duration time rounds, where a time round is a data structure designed to include a predefined number of superframes, each of which includes a fixed number of time slots.

Figure 3:
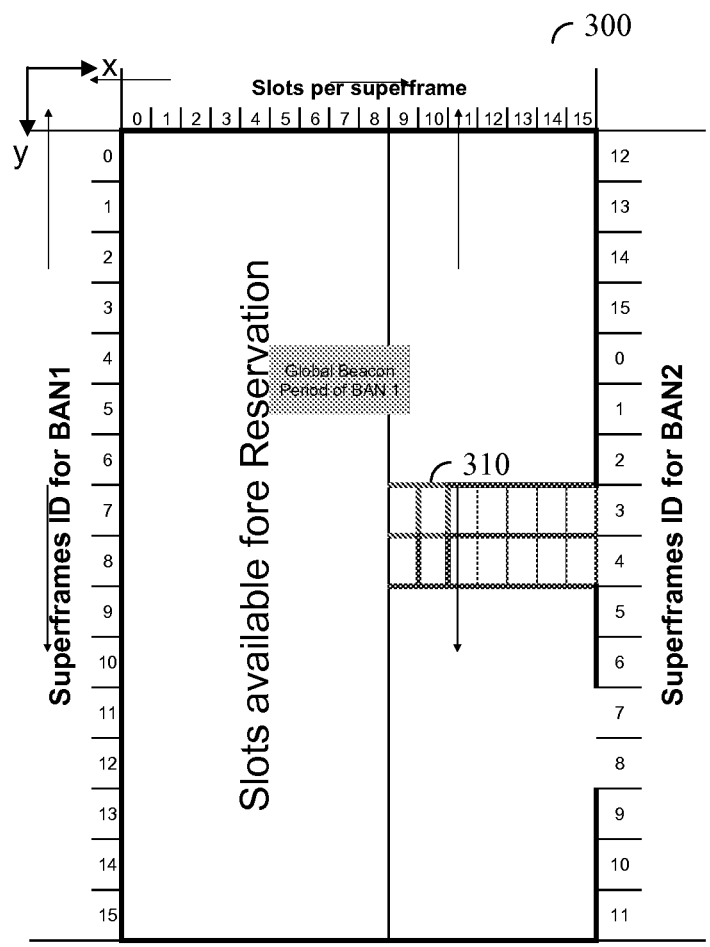
FIG. 3 is a two-dimensional representation of a time round.

FIG. 3 shows an exemplary and non-limiting two-dimensional representation of a time round 300. The X-axis represents the time slots per superframe, and the Y-axis represents the available superframes per time round 300. A superframe is a data structure utilized to exchange information between master devices and between a master device and its respective slave devices.

Master devices can reserve time slots during which the devices have an exclusive right to access the medium. Predefined time slots in a time round are reserved for a global beacon period (GBP) 310. Such time slots are utilized for transmitting global beacons required to facilitate periodic synchronization of master devices. The master devices listen to the global beacon period 310 and send global beacons in their allocated time slots to synchronize and exchange medium reservation requests. Global beacons are also used to discover neighbors and network topology, provide QoS, and schedule the broadcasting or multicasting of messages.

In accordance with an embodiment of the invention global beacons are transmitted using a scheduling method that dynamically constructs and maintains a logical tree topology of master devices in the BAN. Accordingly, a global beacon period is divided into two time periods: an ascending period (AP) and a descending period (DP).

During the AP, all master devices, but the root device, transmit their global beacons in their respective slots in ascending order, i.e., children transmit their global beacons before their parents. During the AP, parents listen to their children's global beacons. During the DP the sequence of global beacon transmissions is reversed, i.e., parents transmit their global beacons before their children. In this period children listen to their parent's global beacons.

During the AP, global information is passed from children to ancestors (parents). At the end of the AP, the root device knows the complete global information which it distributes to all the master devices during the DP. Thus, the global beacon scheduling method ensures that all the master devices belonging to the same BAN receive the global information even though they are hidden (not in direct communication range) from each other.

At the end of a global beacon period 310, all master devices know the reservation requests from every other master device. In one embodiment of the invention only revised reservation requests are propagated to other master devices. In the absence of revised reservation requests, the requests of the last round are preserved.

In accordance with certain principles of the invention the global information about reservation requests is used to derive a unique, consistent and non-overlapping schedule of subframe transmissions. A subframe represents a contiguous block of slots allocated to a master device. With this aim, each master device independently schedules subframes, but arrives at a unique and consistent schedule of conflict-free reservations. Thus, all the master devices know the locations of their peers' devices subframes in the next round.

In one embodiment of the invention a scheduling method executed by a master device includes scheduling all the requests sequentially (e.g., based on MAC addresses or on a first come first serve basis) provided that sufficient time slots are available. When sufficient slots are not available to accommodate all the reservation requests, requests can be prioritized based on service categories. Gathering reservation requests and scheduling of the subframes for a next time round is performed in a current time round.

Figure 4:
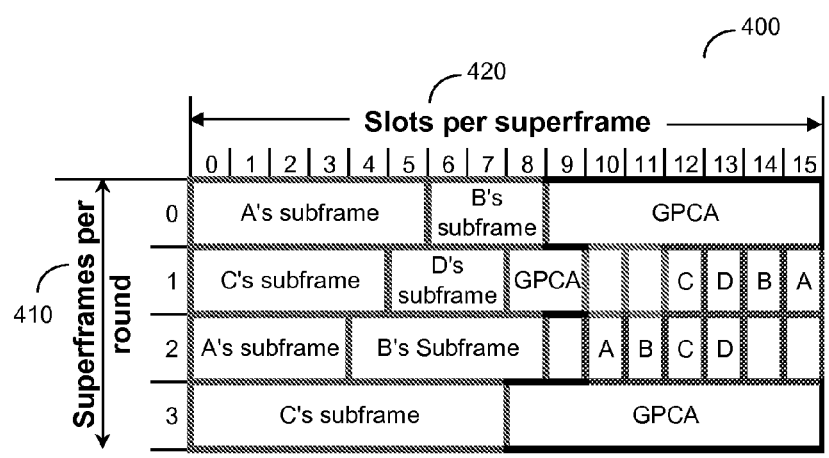
FIG. 4 is a two-dimensional organization of a time round derived by sequentially scheduling reservation requests.

As a non-limiting example, FIG. 4 shows a two-dimensional organization of a time round 400 derived by sequentially scheduling reservation requests. The time round 400 consists of 4 superframes 410, and reservation requests received from master devices are as listed in Table 1. As depicted in FIG. 4, time slots 420 in a superframe 410 are contiguously reserved according to a number of time slots requested by each master device.

TABLE 1

| Superframe | Masters' request for slots | | | |
|---|---|---|---|---|
| ID | A | B | C | D |
| 0 | 6 | 3 | 0 | 0 |
| 1 | 0 | 0 | 5 | 3 |
| 2 | 4 | 5 | 0 | 0 |
| 3 | 0 | 0 | 8 | 0 |

The global knowledge of reservation requests results in compact scheduling where time slots are allocated contiguously. The unreserved time slots are grouped together towards the end of a superframe and can be used as, for example, global prioritized contention access (GPCA) to the medium. This results in efficient channel utilization. Furthermore, the contiguous time slots allocation results in fewer transitions from a sleep mode to an active mode which improves the energy efficiency.

In accordance with another embodiment of the invention an advanced scheduling method can be utilized to allocate subframes based on the priority levels of underlying applications and services. For example, medical applications should not be deprived of medium access due to existing reservations by entertainment applications. The global knowledge of reservation requests can help devices to exercise effective admission control and prioritization.

In accordance with an embodiment of the invention, a master device can broadcast or multicast messages to other master devices (referred to as global broadcast/multicast). To this end, master devices embed a request for global broadcast/multicast in their global beacons. The scheduling method determines time slots reserved for global broadcast/multicast data transfers which are known to all master devices. Intended master devices listen to the slots reserved for global broadcast/multicast. A master device that receives a broadcast/multicast message determines if the messages need to be forwarded to its slave devices.

It should be appreciated that the subframe scheduling methods described herein enable dynamic and scalable duty cycling that can be adapted according to latency requirements and traffic conditions of the BAN. These techniques thereby allow for saving power without compromising QoS.

Certain embodiments of the invention also include a method for enabling efficient data transfers between peer master devices and between a master device and its respective slave devices. The method employs prioritized contention-based access for differentiated QoS classes and reservation based access for reliable communications between devices.

As mentioned above, master devices reserve time slots for their respective subframes using global beacons, and timings of subframes are known globally to all the master devices.

Figure 5:
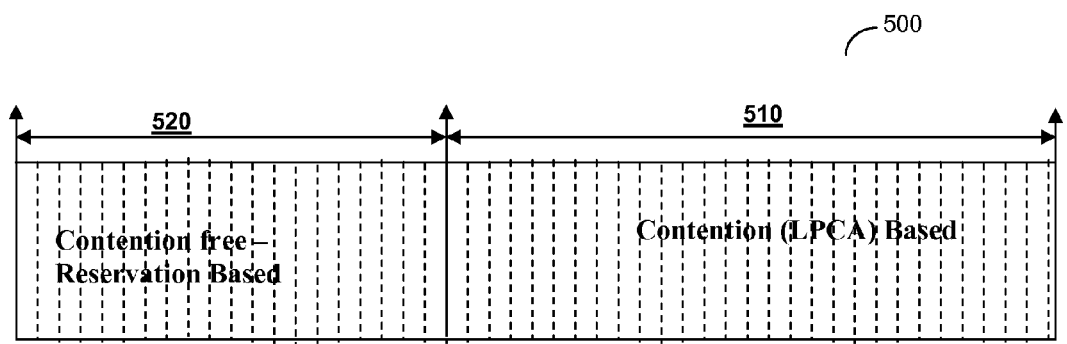
FIG. 5 is a diagram for illustrating an allocation of time slots in a superframe in accordance with an embodiment of the invention.

Time slots within a subframe can be reserved for QoS enabled or periodic traffic, while unreserved time slots within a subframe can be accessed using local prioritized contention access (LPCA) mechanism for on-demand traffic. This is further illustrated in FIG. 5, where a subframe 500 includes contention-based access (LPCA) period 510 and contention-free 520 (reservation based) access period.

The reservation time must occupy contiguous time slots. The contention-free period 520 grows or shrinks depending on the total length of combined reserved time slots. Each device transmitting in reserved time slots ensures that its transaction (DATA and acknowledgment) is completed before the reserved time expires.

In one embodiment, the reserved slots are de-allocated when they are no longer required. The reservation owner or the master device can de-allocate slots at any time at its discretion, for example, if a time slot is unused for a predefined duration. A device that has been allocated time slots may also operate in the LPCA period.

Each reserved time slot can be marked as transmit or receive relative to the data flow from the device that owns the reservation. For each allocated reservation the owner device stores the type of reservation, its starting time slot, length, number of slots, direction, periodicity and associated device address.

The contention-based access period 510 is used for on-demand access, as well as for new devices joining the BAN. All the frames, except acknowledgement frames and any data frames that follow the request frames, transmitted during the contention-based access period 510 utilize the LPCA mechanism to access the medium.

Figure 6A:
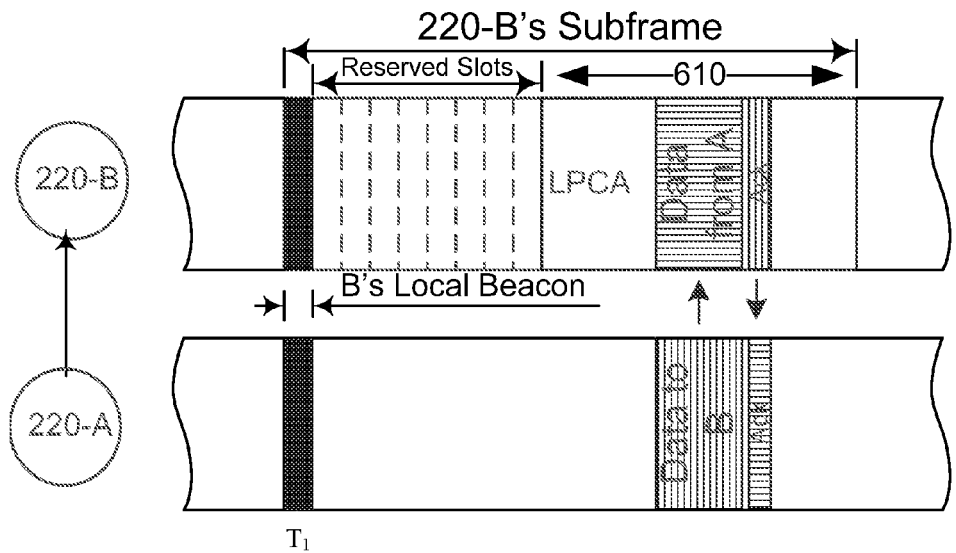
FIGS. 6A and 6B are diagrams for illustrating contention-based and reservation based data transfers between master devices implemented in accordance with an embodiment of the invention.

FIG. 6A illustrates the contention-based data transfer from a master device 220-A to a master device 220-B implemented in accordance with an embodiment of the invention. Master devices 220-A and 220-B know the reservation schedule of each other. At T1, device 220-A wakes up and listens to a local beacon of device 220-B to synchronize and locate a contention-based (LPCA) period 610. A local beacon is part of a subframe and typically sent by a master device to its peer master devices or slave devices. Typically, local beacons carry synchronization, time slot allocation and boundary information, which help slave devices synchronize with their master devices, find allocated slots and deduce the boundary of the LPCA period. Device 220-A contends for the medium to transmit data to device 220-B during the LPCA period 610 in one of the subframes of device 220-B. Depending on the acknowledgement policy, device 220-B may acknowledge successful reception of the data from device 220-A.

If device 220-A has more data for device 220-B which it may not be able to transmit to device 220-B during a current subframe, then device 220-A can either wait until the next subframe of device 220-B arrives (if data is not time sensitive) or device 220-A can request device 220-B to remain awake during a designated GPCA period. The devices 220-A and 220-B can communicate during the GPCA period if both agree to remain awake during this period. This can be performed if one or more of the following conditions apply: data to be transferred by device 220-A is time sensitive; device 220-A buffers are nearly full; subframes allocated to device 220-B are widely spaced; and device 220-A experienced significant contention and back offs while trying to access the medium during a subframe allocated to device 220-B.

Figure 6B:
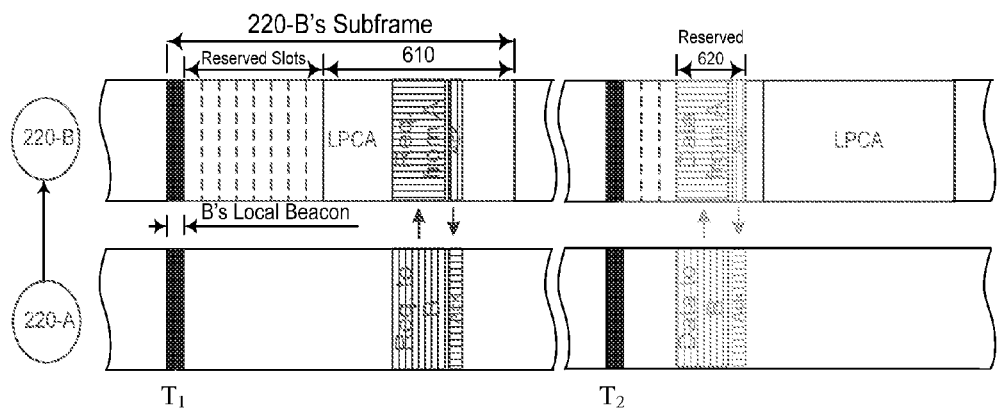

FIG. 6B illustrates the reservation based data transfer from a master device 220-A to a master device 220-B implemented in accordance with an embodiment of the invention. At T1, device 220-A wakes up and listens to a local beacon of device 220-B to synchronize and locate the contention-based (LPCA) period 610. Device 220-A contends for the medium to transmit a reservation request during the time period 610. The reservation request identifies a number of time slots, direction of data transfer, and ownership information. Device 220-B may acknowledge the request. If the request can be partially or fully accommodated in the subframes allocated to device 220-B during a current time round, slots are allocated in those subframes. Otherwise, device 220-B updates its reservation requests for the next time round and secures the time slots for device 220-A during its subframes in the subsequent time rounds. Device 220-B may secure new subframes at desired locations in a time round via global beacons to accommodate device 220-A request.

The time slot allocation information is embedded in a local beacon transmitted by device 220-B. At time T2, device 220-A listens to a local beacon of device 220-B to locate the slots allocated to it. Subsequently, device 220-A transmits to device 220-B during the time slots 620 allocated to 220-A by 220-B. If time slot allocation information is not found in the local beacon within a predefined timeframe, device 220-A will notify a failure to a higher layer.

Figure 7A:
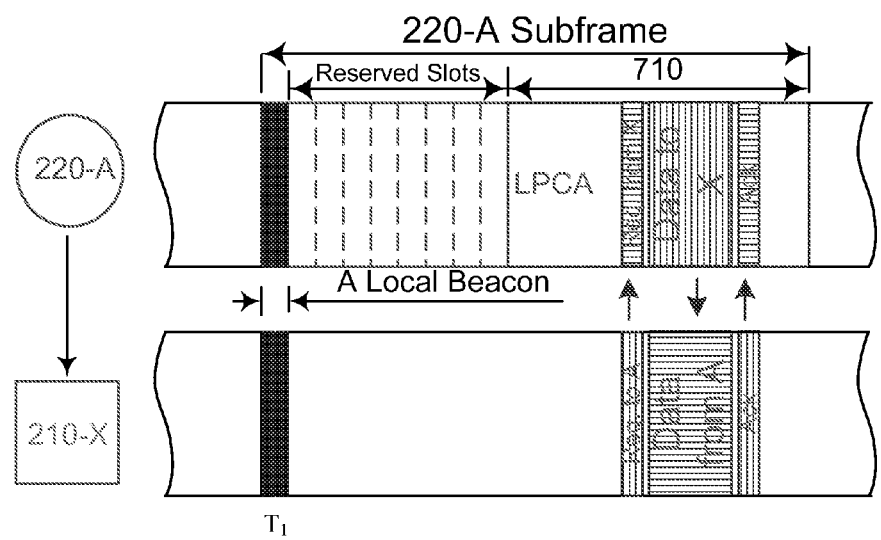
FIGS. 7A and 7B are diagrams for illustrating contention-based and reservation based data transfers from a master device to a slave device implemented in accordance with an embodiment of the invention.

FIG. 7A illustrates the contention-based data transfer from a master device 220-A to a slave device 210-X implemented in accordance with an embodiment of the invention. At T1, slave device 210-X listens to a local beacon of device 220-A to synchronize and locate the contention-based (LPCA) period 710. The local beacon further indicates pending messages (if any) to the slave device 210-X. Upon reception of the local beacon, slave device 210-X transmits a request to receive the pending messages to device 220-A during the LPCA period 710 of a subframe allocated to master device 220-A. Depending on the acknowledgement policy, master device 220-A may acknowledge the request sent from slave device 210-X. Thereafter, master device 220-A transfers the pending messages to the slave device 210-X. The devices 220-A and 210-X may decide to continue the message exchange during a designated GPCA period. Upon successful completion of the data transmission, the message is removed from a list of pending messages in the local beacon.

Figure 7B:
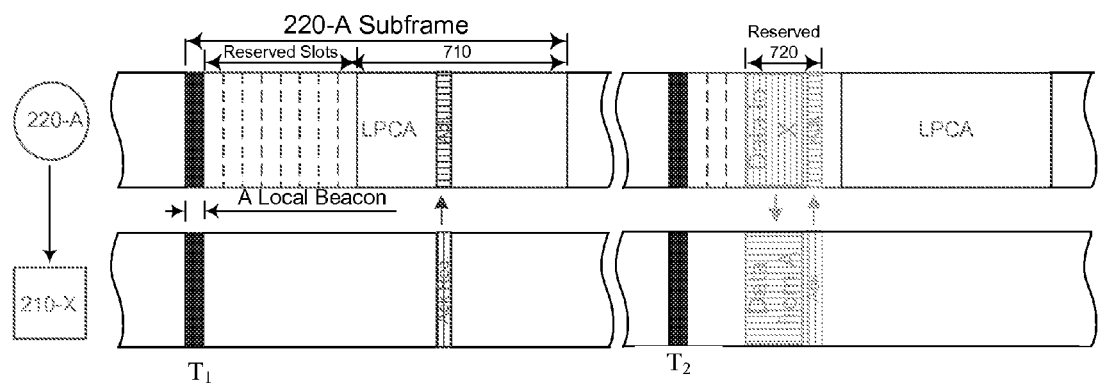

FIG. 7B illustrates the reservation based data transfer from master device 220-A to slave device 210-X implemented in accordance with an embodiment of the invention. Master device 220-A indicates in its local beacon its intention to reserve time slots for slave device 210-X. Master device 220-A also indicates the reservation repetition period. At T1, slave device 210-X wakes up, listens to a local beacon of master device 220-A and learns about pending reservation requests. Slave device 210-X acknowledges the reservation during a LPCA period 710. Upon receiving the acknowledgement, master device 220-A allocates time slots for slave device 210-X.

After the reservation is established, slave device 210-X tracks local beacons of master device 220-A to synchronize and locate the slots allocated to it. Device 220-A transmits data to device 210-X during the time slots 720 reserved for slave device 210-X. Depending on the acknowledgement policy, slave device 210-X may acknowledge the messages sent from device 220-A. Devices 220-A and 210-X may decide to continue the message exchange during a designated LPCA or GPCA period.

Figure 8A:
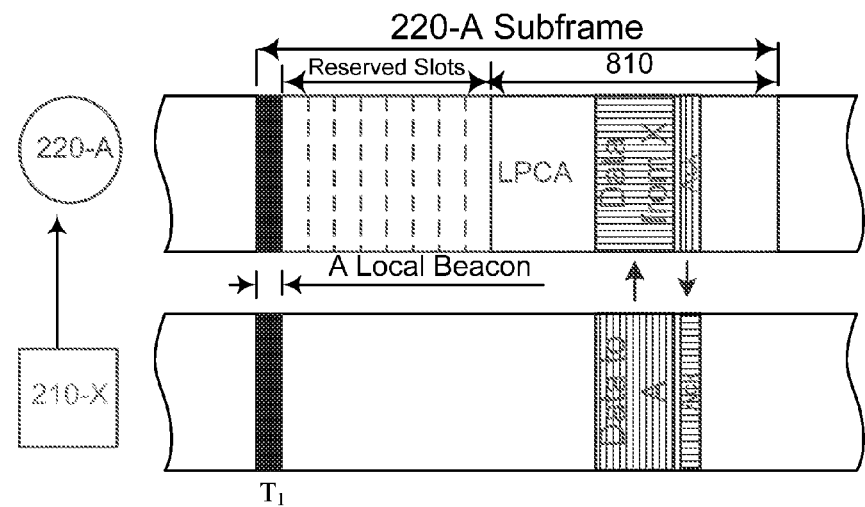
FIGS. 8A and 8B are diagrams for illustrating contention-based and reservation based data transfers from a slave device to a master device implemented in accordance with an embodiment of the invention.

FIG. 8A illustrates the contention-based data transfer from a slave device 210-X to a master device 220-A implemented in accordance with an embodiment of the invention. At T1, slave device 210-X listens to a local beacon sent by master device 220-A to synchronize and locate a contention-based (LPCA) period 810. Thereafter, slave device 210-X transmits to master device 220-A during the LPCA period 810. Depending on the acknowledgement policy, master device 220-A may acknowledge the messages from slave device 210-X. Devices 220-A and 210-X may decide to continue the message exchange during a designated GPCA period.

Figure 8B:
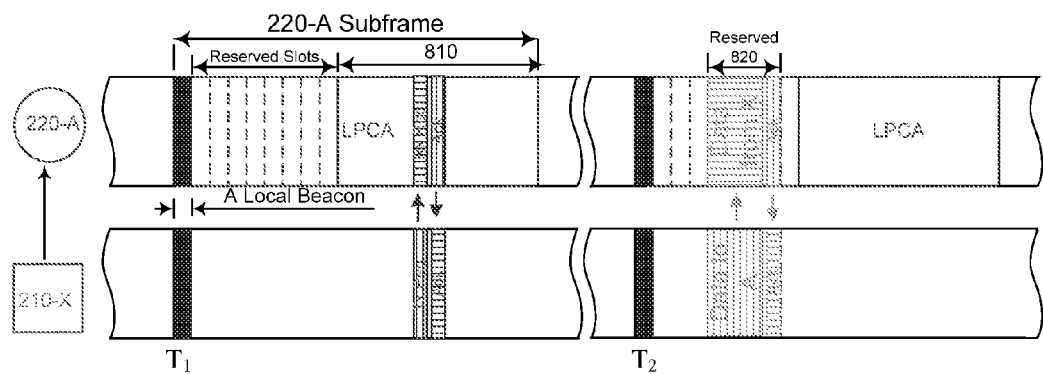

FIG. 8B illustrates the reservation based data transfer from a slave device 210-X to a master device 220-A implemented in accordance with an embodiment of the invention. At T1, slave device 210-X listens to a local beacon of master device 220-A to synchronize and locate a contention-based (LPCA) period 810. During this period, slave device 210-X transmits a reservation request to master device 220-A. Device 220-A may acknowledge the request. If the request can be partially or fully accommodated in the subframes allocated to device 220-A during the current round, then time slots are allocated in those subframes. Otherwise, master device 220-A updates its reservation requests for the next round and secures the time slots 820 for slave device 210-X during the subframes allocated to master device 220-A in subsequent time rounds. It should be noted that master device 220-A may secure new subframes at desired locations in a time round via a global beacon exchange to accommodate requests sent by slave device 210-X.

The slot allocation information is embedded in local beacons transmitted by master device 220-A. At T2, slave device 210-X listens to a local beacon of master device 220-A to locate the time slots 820 allocated to it. Device 210-X can transmit during its reserved time slots 820. In addition, devices 220-A and 210-X may decide to continue the message exchange during a designated LPCA or GPCA period. If slot allocation information is not found in the local beacon within a predefined timeframe, slave device 210-X will indicate a failure to a higher layer.

Figure 9A:
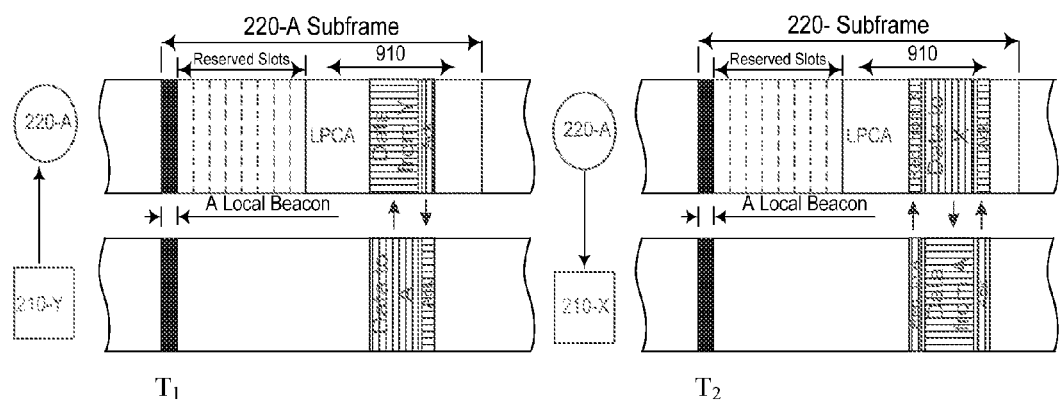
FIGS. 9A and 9B are diagrams for illustrating contention-based and reservation based data transfers between slave devices implemented in accordance with an embodiment of the invention.

FIG. 9A illustrates the contention-based data transfer from a slave device 210-Y to a slave device 210-X implemented in accordance with an embodiment of the invention.

The slave devices can sleep for a prolonged duration of time: a slave device does not know when other slave devices are scheduled to wake-up. Therefore, slave device 210-Y does not know in which subframe device 210-X wakes up. Moreover, when slave device 210-X wakes up, it listens only to local beacons of a master device 220-A to check if there is any pending message for it. If there are no pending messages, the device 210-X immediately returns to a sleep state. Therefore, devices 210-X and 210-Y cannot directly communicate with each other even though they are neighbors.

Data transfer between slave devices is performed through a master device. Specifically, at T1, device 210-Y listens to a master device 220-A local beacon to synchronize and locate a contention-based (LPCA) period 910. Then, device 210-Y transmits the message to a master device 220-A during the LPCA period 910 of a subframe of master device 220-A. Thereafter, master device 220-A forwards the message to slave device 210-X as explained above. Devices 210-X and 210-Y may decide to continue the message exchange during a designated LPCA period.

Figure 9B:
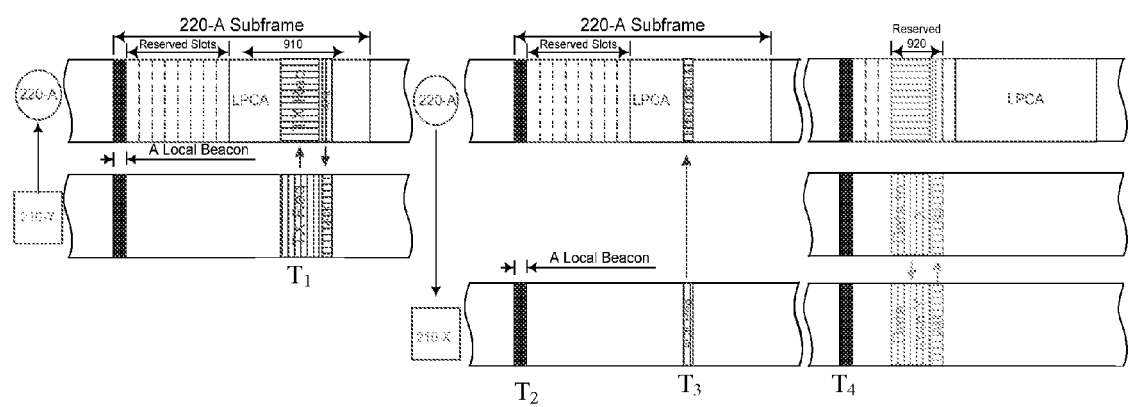

FIG. 9B illustrates the reservation based data transfer from a slave device 210-Y to a slave device 210-X implemented in accordance with an embodiment of the invention. At T1, slave device 210-Y sends a reservation request to slave device 210-X via a master device 220-A, as described above with reference to FIG. 8B. At T2, slave device 210-X listens to a local beacon sent by the master device 220-A that includes at least the information about time slots to be reserved for data transfers from slave device 210-Y to slave device 210-X. At T3, slave device 210-X acknowledges the request, and master device 220-A allocates the time slots to be reserved for the data transfers. If the request can be partially or fully accommodated in the subframes allocated to master device 220-A during the current round, the time slots are allocated in those subframes. Otherwise, master device 220-A updates its reservation requests for the next round and reserves time slots for slave devices 210-X and 210-Y during subframes in the subsequent rounds. The time slots allocation information is embedded into local beacons sent by master device 220-A. At T4, slave devices 210-X and 210-Y listen to a local beacon of master device 220-A to locate the time slots allocated to devices 210-X and 210-Y. Devices 210-X and 210-Y can communicate during the reserved slots 920. Devices 210-X and 210-Y may also decide to continue the message exchange during a designated LPCA or GPCA period. If time slot allocation information is not found in the local beacon within a predefined timeframe, devices 210-X and 210-Y report a failure to a higher layer.

In accordance with another embodiment of the invention, a master device can broadcast or multicast messages to its respective slave devices (local broadcast/multicast). To this end, the master device reserves the time slot for local broadcast/multicast of messages in its subframes and announces the reservation in its local beacons. Slave devices listen to local beacons and learn about the scheduled broadcast/multicast and the corresponding reserved time slots. Intended slave devices listen to the designated time slots to receive the broadcast/multicast transmission. Master devices may have to store broadcast messages for sleeping slave devices. Slave devices can broadcast/multicast messages through their respective master devices.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method for transferring data among devices in a body area network (BAN) including a plurality of slave devices and a plurality of master devices arranged in a two-tier architecture, comprising:
dividing an access time to a wireless medium of the BAN into at least a contention-based period and a contention-free reservation period;
allowing devices to transfer data during the contention-based period using a local prioritized contention access (LPCA) mechanism; and
allowing only devices having reserved time slots to transfer data during the contention-free reservation period, wherein the time slots in the contention-free reservation period are reserved by the plurality of master devices based, in part, on reservation requests received from devices requesting to transmit data.

2. The method of claim 1, wherein data transfers are between master devices, between a master device and its peer respective slave devices, and between slave devices.

3. The method of claim 2, wherein transferring data from a first master device to a second master device during the contention-based period comprises:
causing the first master device to listen to a local beacon sent by the second master device in order to synchronize and locate the contention-based period of the second master device; and
causing the first master device to contend for the wireless medium to transfer data during the contention-based period of the second master device.

4. The method of claim 2, wherein transferring data from a first master device to a second master device during the contention-free reservation period comprises:
causing the first master device to listen to a local beacon sent by the second master device in order to synchronize and locate the contention-based period of the second master device;
causing the first master device to contend for the wireless medium to transfer a reservation request during the contention-based period of the second master device;
allocating time slots to the first master device in the contention-free reservation period of the second master device based on the reservation request;
causing the first master devices to listen to a local beacon sent by the second master device to synchronize and locate the allocated time slots;
allowing the first master device to transfer data to the second master device in the allocated time slots.

5. The method of claim 2, wherein transferring data from a master device to a slave device during the contention-based period comprises:
causing the slave device to listen to a local beacon sent by the master device in order to synchronize and locate the contention-based period of the master device, wherein the local beacon indicates on messages pending for the slave device;
sending by the slave device a request to receive the pending messages from the master device; and
transferring the pending messages from the master device to the slave device during the contention-based period of the master device.

6. The method of claim 2, wherein transferring data from a master device to a slave device during the contention-free reservation period comprises:
causing the slave device to listen to a local beacon sent by the master device, wherein the local beacon includes at least information about time slots to be reserved for data transfers from the master device to the slave device;
acknowledging the time slot allocation request by the slave device;
allocating time slots for the slave device in the contention-free reservation period of master device;
causing the slave device to listen to local beacons of the master device in order to synchronize and locate the time slots allocated for the slave device;
transferring data from the master device to the slave device in the allocated time slots.

7. The method of claim 2, wherein transferring data from a slave device to a master device during the contention-based period comprises:
causing the slave device to listen to a local beacon sent by the master device in order to synchronize and locate the contention-based period of the master device; and
causing the slave device to contend for the wireless medium to transfer data during the contention-based period of the master device.

8. The method of claim 2, wherein transferring data from a slave device to a master device during the contention-free reservation period comprises:
causing the slave device to listen to a local beacon sent by the master device in order to synchronize and locate the contention-based period of the master device;
sending a reservation request from the slave device to the master device during the contention-based period of the master device;
allocating time slots to the slave device in the contention-free reservation period of the master device based on the reservation request;
causing the slave devices to listen to a local beacon sent by the master device to synchronize and locate the allocated time slots;
transferring data from the slave device to the master device in the allocated time slots.

9. The method of claim 2, wherein transferring data from a first slave device to a second slave device during the contention-based period comprises:
causing the first slave device to listen to a local beacon sent by a master device in order to synchronize and locate the contention-based period of the master device;
causing the first slave device to contend for the wireless medium to transfer data during the contention-based period of the master device;
causing the second slave device to listen to a local beacon sent by the master, wherein the local beacon indicates on messages pending for the second slave device;
sending by the second slave device a request to receive the pending messages from the master device; and
transferring the pending messages from the master device to the second slave device during the contention-based period of the master device.

10. The method of claim 9, wherein transferring data from a first slave device to a second slave device during the contention-free reservation period comprises:
causing the first slave device to listen to a local beacon sent by a master device in order to synchronize and locate the contention-based period of the master device;
sending a reservation request from the first slave device to the master device during the contention-based period of the master device;
causing the second slave device to listen to a local beacon sent by the master device, wherein the local beacon includes at least information about time slots to be reserved for data transfers from the first slave device to the second slave device;

acknowledging the time slot allocation request by the second slave device;

allocating time slots in the contention-free reservation period of the master device;

causing the first slave device and the second slave device to listen to a local beacon sent by the master device to synchronize and locate the allocated slots; and transferring data from the first slave device to the second slave device in the allocated time slots.

11. The method of claim 2, wherein the duration of the contention-free reservation period is dynamically changed according to the number of allocated time slots, wherein the duration of the contention-based access period is shortened if no messages are received during a predefined time interval.

12. The method of claim 11, wherein reserved time slots can be de-allocated by a master device.

13. The method of claim 2, wherein the contention-based period is used for transferring on-demand data.

14. A wireless device operable in a body area network (BAN) including a plurality of slave devices and a plurality of master devices arranged in a two-tier architecture, comprising:

a radio transceiver configured to receive and transmit radio signals over a medium of the body area network;

a processor;

a memory for storing instructions that, when executed, configure the processor to:

divide an access time to a wireless medium of the BAN into at least a contention-based period and a contention-free reservation period;

allow devices to transfer data during the contention-based period using a local prioritized contention access (LPCA) mechanism; and allow only devices having reserved time slots to transfer data during the contention-free reservation period, wherein the time slots are reserved by the plurality of master devices based, in part, on reservation requests received from devices requesting to transmit data.

* * * * *